July 20, 1926.
H. R. BADGER
BREAD BOX
Filed June 16, 1921
1,593,154
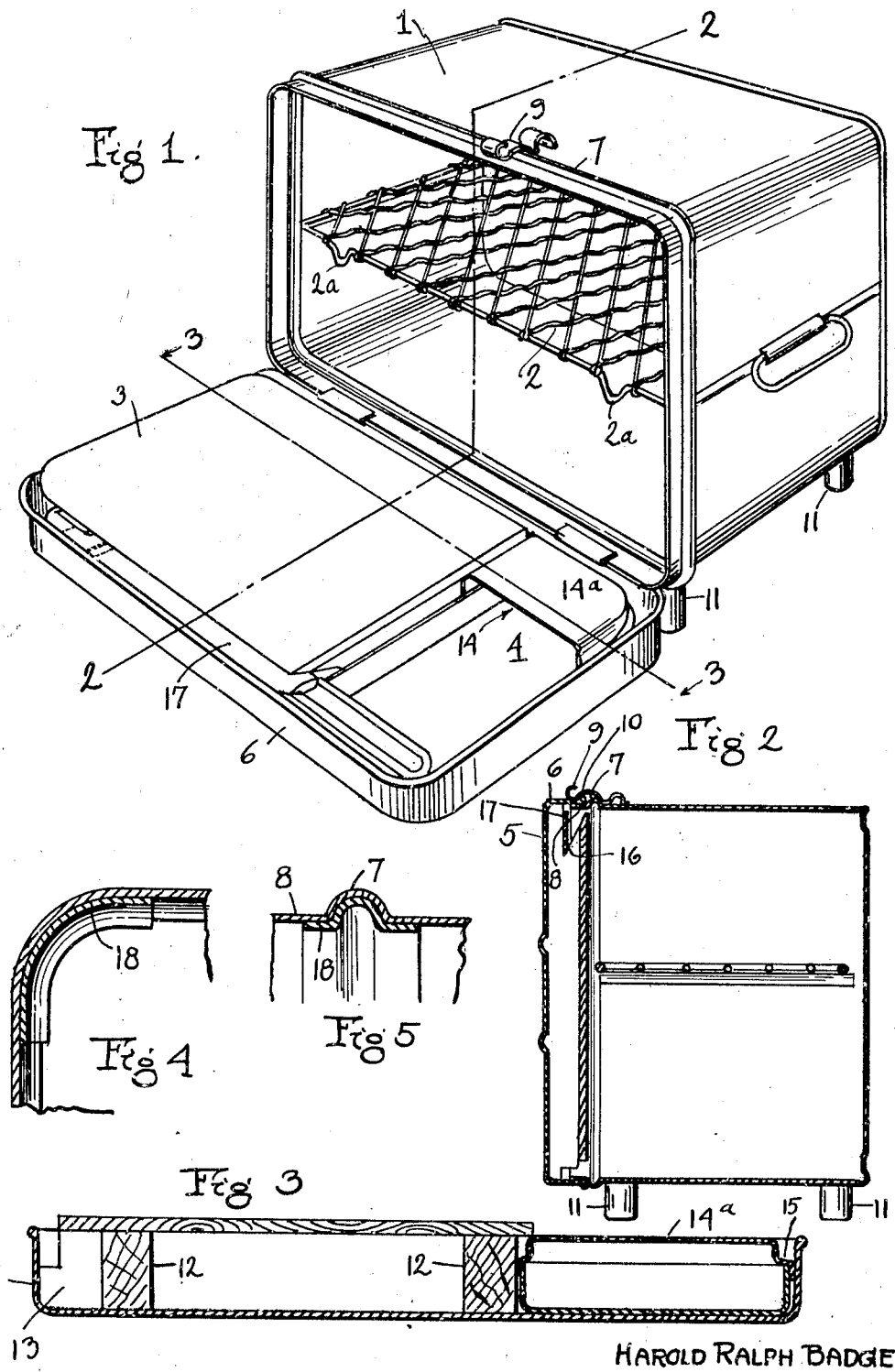
HAROLD RALPH BADGER
INVENTOR
BY John Powers
ATTORNEY Patented July 20, 1926.

1,593,154

UNITED STATES PATENT OFFICE.

HAROLD RALPH BADGER, OF BUFFALO, NEW YORK.

BREAD BOX.

Application filed June 16, 1921. Serial No. 478,144.

This invention relates to improvements in bread boxes for domestic use.

The invention consists generally in novel features of combination subsisting among the box, its closure, the bread board and the crumb tray; the invention also consists in novel structural details appurtenant to such features of combination. Thereby important advantages are secured which as the aggregate of all of the features incorporated in the preferred construction herein disclosed may be enumerated as follows: the structural combination is unitary; the bread board, knife and crumb tray are rendered instantly accessible by the simple operation of opening the box and are as instantly concealed and secured in their proper place within the box merely by the operation of closing the same; steps are eliminated as are also many motions of the hands and repeated handling of the bread and utensils; crumbs are saved and put away without any additional labor; and the effective capacity of the box is doubled. Withal, the box and its associated parts, the bread board, knife and crumb tray, although in unitary operative combination, are readily and instantly accessible for the purpose of cleaning; and the box proper, although having its effective capacity doubled, is of no greater size and costs no more to manufacture than a bread box of ordinary form.

The features of the invention will be set forth at length as the description proceeds and are incorporated in the construction shown, by way of example, in the accompanying drawing in which:

Figure 1 is a perspective view showing the box open and the bread board, knife and crumb tray ready for use.

Figure 2 is a vertical section in the plane 2—2 of Figure 1 but showing the box closed.

Figure 3 is a longitudinal sectional view on the line 3—3 of Figure 1, showing the cover and the bread board and crumb tray fitted therein.

Figures 4 and 5 are detail sectional views in planes at right angles to one another showing the corner reinforcement of the marginal flange and rib of the box.

The box 1 is of rectangular form and is preferably open at the front instead of at the top as in the ordinary construction; by such an arrangement a shelf 2 may be provided within the box whose effective capacity is thus doubled. The shelf 2 is preferably of mesh construction and provided with supporting legs $2^a$ by reason of which features it may be placed upon the top of the box to serve as a cooling rack for freshly baked bread.

The bread board 3 and crumb tray 4 are carried by the movable closure and where the box is open at the front, as shown, such closure comprises the front wall 5. The wall 5 is hinged to the box along its lower edge and is provided with an inwardly projecting marginal flange 6. The box is provided near its edge with a rib 7 and has a marginal portion 8 projecting beyond the rib. When the wall 5 is closed its flange 6 engages over the marginal portion 8 and against the rib 7. The wall 5 may be held in closed position by a suitable spring catch 9 secured to the upper wall of the box and engaging the edge bead 10 of the flange 6.

As shown and preferred the lower wall of the box is provided with short supporting legs 11 and is thereby supported above the cover 5 when the latter rests in open position upon the suporting shelf or table.

The bread board 3 and crumb tray 4 are arranged within the flange 6 which thus constitutes a confining frame. The bread board may be provided with supporting cleats 12 disposed at a right angle to the hinged side of the wall 5 and which project beyond the sides of the board, at their ends fitting closely against the flange 6. The projecting portions of the cleats serve as shoulders to bear against the marginal portion 8 and prevent the bread board from becoming displaced when the wall 5 is closed. A block 13, providing a similar shoulder, may be secured at the end of the board adjacent the flange 6.

The board 3 occupies about two thirds of the confining frame provided by the flange 6 and adjoins one end of the wall 5 and the rest of the frame is occupied by the crumb tray 4, which adjoins the other end of said wall. The crumb tray consists of a pan-like receptacle whose upper side is open for about two thirds of its extent and is closed for the rest of its extent, an end pocket 14 adjoining the hinged side of the wall 5 being thereby provided. In the construction preferred the pocket 14 is provided by means of a short top wall 14ª flanged on three sides and engaging frictionally in the manner of a cap over the side and inner end walls of the crumb tray, the cap 14ª being thus readily removable and replaceable. The flange of the top wall 14ª is offset to provide a limiting shoulder 15 which bears against the adjacent walls of the tray and in the closed position of the wall 5 engages against the marginal portion 8, the tray being thereby held against displacement. The end of the board 3 which adjoins the crumb tray projects beyond the adjacent supporting cleat 12 and preferably overhangs and engages the crumb tray, i. e. the wall 14ª of said tray, to aid in holding the same against displacement when the box is closed. In order to provide against any fine crumbs finding lodgment outside of the tray the walls of the tray are made to fit closely against the flange 6 along the ends and one side of the tray and against the adjacent cleat 12 along the other side of the tray.

The cleats 12 are preferably undercut as at 16 adjacent the outer side of the wall 5 to co-operate with the flange 6 in providing a clearance in which a bread knife 17 may be accessibly confined, the blade lying under the board and the handle lying over the adjacent end of the tray 4.

The corner angles of the rib 7 and marginal portion 8 are preferably reinforced by internal strengthening pieces 18 secured by welding.

As shown in Figure 1, when the wall 5 is lowered to a horizontal position the bread board and crumb tray are disposed in front of the open box and ready for use. The loaf of bread is taken from either compartment of the box, placed on the bread board and sliced by the knife 17 lying right at hand, ready to be gripped and used. The unused portion of the loaf is put back in the box, the slices laid upon the plate, and the crumbs are swept from the board into the open side of the tray, using the back of the blade as a scraper. The knife is then replaced and the front wall 5 restored to closed position, the crumbs falling into the pocket 14 of the tray. When after repeated use of the board a sufficient quantity of crumbs has been accumulated in the pocket 14 the tray may be removed from the wall 5 and the crumbs placed in a jar or other suitable container for use as needed. If it be desired that the crumbs be dried or toasted the tray may be placed in the oven and used as a drying or toasting pan.

The bread board, tray and knife may be instantly removed from the wall 5 when it is desired to clean them or to clean the wall and the box and may be as quickly and readily put back in place.

It will be understood that modifications may be resorted to within the scope of the appended claims.

Having fully described my invention, I claim:

1. In combination, a bread box having a hingedly mounted wall constituting a closure and movable to an open position wherein it occupies a horizontal plane, said wall having a marginal flange, and a bread board removably fitted within said flange as a confining frame and participating in the opening and closing movements of said wall, the flange taking over the marginal portion of the box in the closed position of the movable wall and said marginal portion at the same time engaging the bread board to prevent displacement thereof.

2. In combination, a bread box having a hingedly mounted wall constituting a closure and movable to an open position wherein it occupies a horizontal plane, said wall having a marginal flange, and a bread board removably fitted within said flange as a confining frame and participating in the opening and closing movements of said wall, the bread board being formed with a clearance in which a bread knife may be accessibly confined, the clearance being of such outline as to prevent the displacement of the knife in the vertical position of the bread board and to permit the withdrawal of the knife in the horizontal position of the bread board.

3. In combination, a bread box having a movable wall constituting a closure and mounted to occupy a horizontal plane when in open position and a bread board and crumb tray carried by said wall, at the inner side thereof the crumb tray immediately adjoining the bread board and having an open side into which crumbs may be swept from said board and the bread board and crumb tray being enclosed by the box when the movable wall is closed.

4. In combination, a bread box having a movable wall constituting a closure and mounted to occupy a horizontal plane when in open position, said wall having a marginal flange and a bread board and crumb tray removably fitted within said flange as a confining frame and participating in the opening and closing movements of said wall, the crumb tray immediately adjoining the bread board and having an open side into which crumbs may be swept from said board.

5. In combination, a bread box having a hingedly mounted movable wall constituting a closure and movable to an open position wherein it occupies a horizontal plane, said wall having a marginal flange, and a bread board and crumb tray removably fitted within said flange as a confining frame and participating in the opening and closing movements of said wall, the crumb tray immediately adjoining the bread board and having an open side into which crumbs may be swept from said board, the flange taking over the marginal portion of the box in the closed position of the movable wall and said marginal portion at the same time engaging the bread board and crumb tray to prevent displacement thereof.

6. In combination, a bread box having its front wall hingedly mounted for downward opening movement and a crumb tray carried by said movable wall and having its side which is uppermost when the wall is lowered open for a portion of its extent and closed adjacent the hinged side of said wall, thereby to provide a pocket into which the crumbs fall when said wall is moved to its closed position.

7. In combination, a bread box having its front wall hingedly mounted for downward opening movement and a bread board and crumb tray carried by said wall in immediate mutual adjacency and participating in the movements thereof, the crumb tray having an opening in its side which is presented uppermost when the front wall is lowered.

8. In combination, a bread box having a hinged wall constituting a closure and provided with a marginal flange and a bread board removably fitted within said flange as a confining frame and having supporting parts which project beyond the working surface of said board, said flange engaging over the marginal portion of the box and said marginal portion at the same time engaging said supporting parts to prevent displacement of the bread board.

9. In combination, a bread box having a hinged wall constituting a closure and provided with a marginal flange, a bread board removably fitted within said flange adjacent one end of said wall and having supporting parts which project beyond the working surface of said board and a crumb tray fitted within said flange adjacent the other end of said wall, the bread board overhanging the crumb tray, said flange engaging over the marginal portion of the box and said marginal portion at the same time engaging said supporting parts to prevent displacement of the bread board.

10. In combination, a bread box having a hinged wall constituting a closure and provided with a marginal flange, and a bread board fitted within said flange as a confining frame and having supporting parts which project beyond the working surface of said board, said flange engaging over the marginal portion of the box and said marginal portion at the same time engaging said supporting parts to prevent displacement of the bread board, said bread board being formed with a clearance in which a knife may be accessibly confined, the clearance being of such outline as to prevent the displacement of the knife in the vertical position of the bread board and to permit the withdrawal of the knife in the horizontal position of the bread board.

11. In combination, a bread box having a hingedly mounted front wall which may be lowered into a horizontal position, and a bread board removably supported on said wall, the latter having a frame in which said bread board is set, and the marginal portion of the box engaging said board to hold it against displacement when the front wall is vertically disposed to close the box.

12. In combination, a bread box having a hingedly mounted front wall which may be lowered into a horizontal position, and a bread board removably supported on said wall, the latter having a frame in which said bread board is set and the marginal portion of the box engaging said board to hold it against displacement when the front wall is vertically disposed to close the box, the board in turn being formed to provide for the removable mounting within said frame of an accessory part and to confine said part against displacement when the front wall is vertically disposed while permitting the withdrawal of said part when the front wall is horizontally disposed.

In testimony whereof I affix my signature.

HAROLD RALPH BADGER.